US010781762B2

(12) United States Patent
Szczepanski

(10) Patent No.: US 10,781,762 B2
(45) Date of Patent: Sep. 22, 2020

(54) CONTROL SYSTEM FOR VARIABLE DISPLACEMENT ENGINE

(71) Applicant: DENSO International America, Inc., Southfield, MI (US)

(72) Inventor: Edward Szczepanski, Grosse Pointe Woods, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 16 days.

(21) Appl. No.: 16/218,087

(22) Filed: Dec. 12, 2018

(65) Prior Publication Data

US 2020/0191076 A1 Jun. 18, 2020

(51) Int. Cl.
| *F02D 41/00* | (2006.01) |
| *F02D 13/06* | (2006.01) |
| *F01N 11/00* | (2006.01) |
| *F02D 41/22* | (2006.01) |
| *G01M 15/10* | (2006.01) |
| *F02D 41/14* | (2006.01) |

(52) U.S. Cl.
CPC ........ *F02D 41/0087* (2013.01); *F01N 11/007* (2013.01); *F02D 13/06* (2013.01); *F02D 41/1466* (2013.01); *F02D 41/22* (2013.01); *G01M 15/104* (2013.01); *F01N 2430/02* (2013.01); *F02D 2041/228* (2013.01)

(58) Field of Classification Search
CPC combination set(s) only.
See application file for complete search history.

(56) References Cited

U.S. PATENT DOCUMENTS

| 5,526,793 | A | 6/1996 | Johansson |
| 5,721,375 | A | 2/1998 | Bidner |
| 5,930,992 | A | 8/1999 | Esch et al. |
| 6,922,986 | B2 | 8/2005 | Rozario |
| 7,007,457 | B2 | 3/2006 | Ellmer |
| 7,677,027 | B2 | 3/2010 | Iida et al. |
| 7,918,085 | B2 | 4/2011 | Yoshioka |
| 9,200,587 | B2 | 12/2015 | Serrano |
| 9,239,037 | B2 | 1/2016 | Carlson et al. |
| 9,670,819 | B2 | 6/2017 | Aoki et al. |
| 9,778,160 | B2 * | 10/2017 | Zhang ................ G01N 15/0656 |
| 9,790,867 | B2 | 10/2017 | Carlson et al. |
| 9,891,137 | B2 | 2/2018 | Chen et al. |
| 9,896,988 | B2 | 2/2018 | Lee |

(Continued)

FOREIGN PATENT DOCUMENTS

| DE | 102005049069 A1 | 4/2007 |
| DE | 102011088843 A1 | 6/2013 |
| WO | 2019238246 A1 | 12/2019 |

*Primary Examiner* — Binh Q Tran
(74) *Attorney, Agent, or Firm* — Brooks Kushman P.C.

(57) ABSTRACT

A vehicle includes a variable displacement engine, a conduit, a sensor, and a controller. The variable displacement engine has a plurality of cylinders. The conduit is configured to channel exhaust gas away from the cylinders. The sensor is disposed within the conduit and is configured to measure an amount of particulate matter within the exhaust gas. The controller is programmed to, in response to a command to run a diagnostic test, operate each of the plurality of cylinders independently to produce an exhaust gas stream for each cylinder and measure the amount of particulate matter within each of the exhaust gas streams.

20 Claims, 4 Drawing Sheets

(56) References Cited

U.S. PATENT DOCUMENTS

| | | |
|---|---|---|
| 9,982,611 B2 | 5/2018 | Tripathi et al. |
| 10,215,115 B1 | 2/2019 | Ranga et al. |
| 10,323,562 B2* | 6/2019 | Van Nieuwstadt ..... F01N 3/031 |
| 2002/0069638 A1 | 6/2002 | Glugla et al. |
| 2002/0129597 A1 | 9/2002 | Glugla et al. |
| 2004/0098970 A1 | 5/2004 | Foster |
| 2004/0221832 A1 | 11/2004 | Takahashi et al. |
| 2004/0255905 A1 | 12/2004 | Bauerle et al. |
| 2006/0053772 A1 | 3/2006 | Dou et al. |
| 2006/0243040 A1 | 11/2006 | Reed et al. |
| 2007/0051092 A1 | 3/2007 | Pallett et al. |
| 2007/0051351 A1 | 3/2007 | Pallett et al. |
| 2007/0137177 A1 | 6/2007 | Kittelson et al. |
| 2007/0240695 A1 | 10/2007 | Mitsuda et al. |
| 2008/0104949 A1 | 5/2008 | Schmeichel et al. |
| 2008/0243362 A1 | 10/2008 | Mitsuda et al. |
| 2009/0094963 A1* | 4/2009 | Mizoguchi ............. F01N 3/101 60/286 |
| 2009/0118985 A1 | 5/2009 | Whitney et al. |
| 2009/0306846 A1 | 12/2009 | Jeong |
| 2010/0031738 A1 | 2/2010 | Feldkamp et al. |
| 2010/0154738 A1 | 6/2010 | Tsukamoto et al. |
| 2010/0175462 A1 | 7/2010 | Doering et al. |
| 2010/0175463 A1 | 7/2010 | Doering et al. |
| 2010/0288037 A1 | 11/2010 | Gibson et al. |
| 2011/0010071 A1 | 1/2011 | Rhodes et al. |
| 2012/0173122 A1 | 7/2012 | Nishikiori et al. |
| 2014/0041630 A1 | 2/2014 | Carlson et al. |
| 2014/0163841 A1 | 6/2014 | Sane |
| 2014/0261309 A1 | 9/2014 | Chen et al. |
| 2014/0360477 A1 | 12/2014 | Doering et al. |
| 2014/0366835 A1 | 12/2014 | Walter |
| 2015/0051816 A1 | 2/2015 | Glugla et al. |
| 2015/0369155 A1 | 12/2015 | Ueda |
| 2016/0061127 A1 | 3/2016 | Chen et al. |
| 2016/0115884 A1 | 4/2016 | VanDerWege et al. |
| 2016/0195031 A1* | 7/2016 | Willems ............. F02D 41/0087 123/52.1 |
| 2016/0222899 A1 | 8/2016 | Glugla |
| 2016/0258375 A1 | 9/2016 | Jammoussi et al. |
| 2016/0258376 A1 | 9/2016 | Jammoussi et al. |
| 2016/0333809 A1 | 11/2016 | Jammoussi et al. |
| 2017/0321587 A1* | 11/2017 | Marlett .................. F01N 11/00 |
| 2017/0350332 A1 | 12/2017 | Martin et al. |
| 2017/0356353 A1 | 12/2017 | Rollinger et al. |
| 2017/0356363 A1 | 12/2017 | Jammoussi et al. |
| 2017/0356368 A1 | 12/2017 | Richards et al. |
| 2017/0356370 A1 | 12/2017 | Doering et al. |
| 2017/0356374 A1 | 12/2017 | Rollinger et al. |
| 2017/0356380 A1 | 12/2017 | Surnilla et al. |
| 2018/0080398 A1 | 3/2018 | Leone |
| 2018/0216562 A1 | 8/2018 | Dudar |
| 2018/0230914 A1 | 8/2018 | McCarthy, Jr. et al. |
| 2018/0274471 A1 | 9/2018 | Dudar |
| 2019/0033170 A1* | 1/2019 | Dudar .................. F02D 41/221 |
| 2019/0186401 A1 | 6/2019 | Dudar |
| 2019/0218989 A1 | 7/2019 | Dudar |
| 2019/0264628 A1 | 8/2019 | Dudar |
| 2019/0271265 A1 | 9/2019 | Iannone et al. |
| 2019/0339164 A1 | 11/2019 | Kupiec et al. |
| 2019/0390610 A1 | 12/2019 | Ulstad et al. |

\* cited by examiner

CONTROL SYSTEM FOR VARIABLE DISPLACEMENT ENGINE

TECHNICAL FIELD

The present disclosure relates to control systems for variable displacement or skip-fire internal combustion engines.

BACKGROUND

One or more cylinders in a variable displacement internal combustion engine may be shut down or deactivated while the engine is operating, which results in the engine being powered by less than all the cylinders.

SUMMARY

A vehicle includes a variable displacement engine, a conduit, a sensor, and a controller. The variable displacement engine has a plurality of cylinders. The conduit is configured to channel exhaust gas away from the cylinders. The sensor is disposed within the conduit and is configured to measure an amount of particulate matter within the exhaust gas. The controller is programmed to, in response to a command to run a diagnostic test, operate each of the plurality of cylinders independently to produce an exhaust gas stream for each cylinder and measure the amount of particulate matter within each of the exhaust gas streams.

A method of operating a vehicle engine having a plurality of cylinders includes operating each cylinder independently to produce an exhaust gas stream for each cylinder, measuring an amount of particulate matter within each of the exhaust gas streams, and shutting down one or more of the cylinders based on the measured amount of particulate matter in response to a command to decrease the number of operating cylinders.

A vehicle includes an engine, an exhaust pipe, a sensor, and a controller. The engine has first and second banks of cylinders. The exhaust pipe is configured to channel exhaust gas away from the first bank of cylinders. The sensor is disposed within the exhaust pipe and is configured to measure an amount of particulate matter within the exhaust gas. The controller is programmed to, in response to a command to run a diagnostic test, operate each cylinder of the first bank of cylinders independently to produce an exhaust gas stream for each cylinder of the first bank of cylinders and measure the amount of particulate matter within each of the exhaust gas streams produced by each cylinder of the first bank of cylinders.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
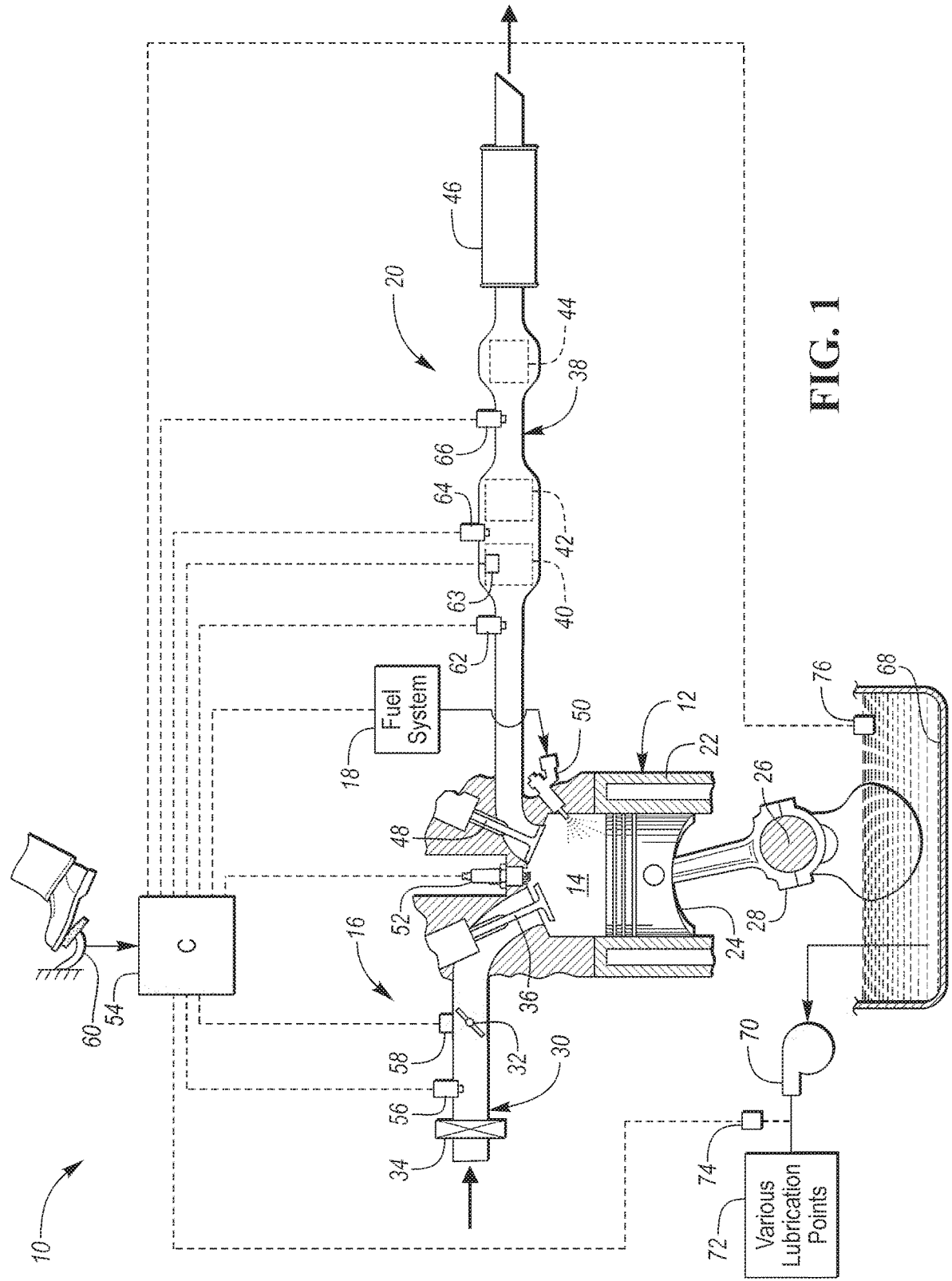
FIG. 1 is a schematic illustration of a vehicle including a single cylinder of an internal combustion engine that has multiple cylinders, an air intake system, a fuel delivery system, and an exhaust system.
Figure 2:
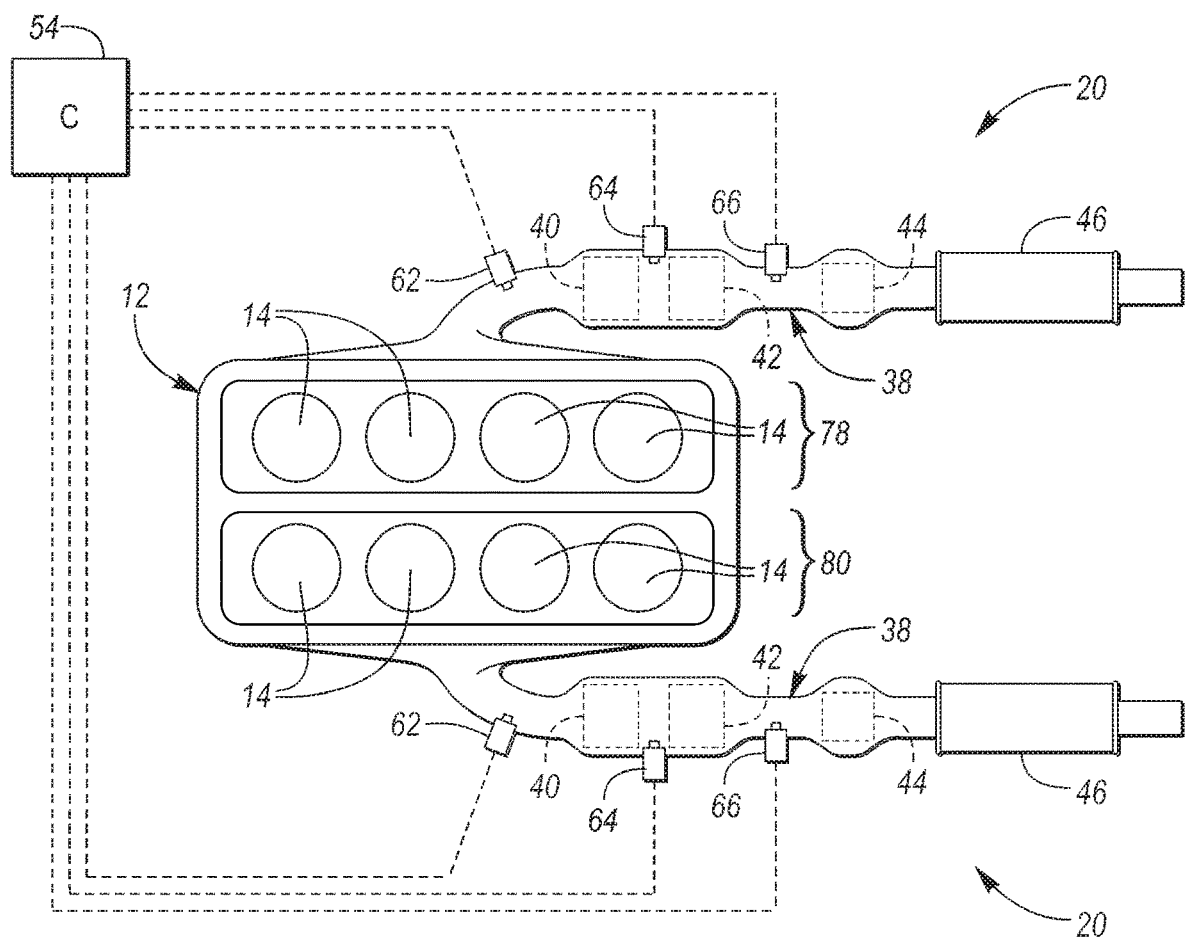
FIG. 2 is a schematic illustration of the multiple cylinders of the internal combustion engine and the exhaust system.

Referring to FIGS. 1 and 2, a vehicle 10 and an internal combustion engine 12 that includes multiple cylinders are illustrated. The schematic of FIG. 1 illustrates a single cylinder 14 of the internal combustion engine 12, an air intake system 16, a fuel delivery system 18, and an exhaust system 20. The schematic of FIG. 2 illustrates the multiple cylinders 14 of the engine 12 and the exhaust system of the engine 12. It should be understood that the single cylinder 14 illustrated in FIG. 1 may be representative of one or all of the cylinders 14 of the engine 12. It should further be understood, that the air intake system 16 and fuel delivery system 18 illustrated in FIG. 1 are representative of the systems that deliver air and fuel, respectively, to all of the cylinders 14 of the engine 12, while the exhaust system 20 illustrated in FIG. 1 is representative of the system that channels exhaust gas away from all of the cylinders 14 of the engine 12.

The engine 12 includes an engine block 22 that defines each of the cylinders 14. A piston 24 is disposed within each of the cylinders 14. The pistons 24 are configured to transfer the energy that results from combusting fuel within each cylinder 14 into kinetic energy, which is utilized to rotate a crankshaft 26. Each piston 24 is connected to the crankshaft 26 via a connecting rod 28. The crankshaft 26 then transfers the rotational energy to one or more drive wheels (not shown) of the vehicle 10 in order to propel the vehicle 10. Intermediate components, such as driveshafts, a torque converter, a transmission gearbox, universal joints, differentials, etc. may be disposed between the crankshaft 26 and the drive wheels. The intermediate components are configured to transfer the rotational power of the crankshaft 26 to the drive wheels.

The air intake system 16 includes one or more manifolds, pipes, ducts, or conduits 30 that are configured to channel air from the ambient surroundings and into the cylinders 14. The amount of air that is being channeled into the cylinders 14 may be controlled by the throttle valve 32. An air filter 34 may be disposed proximate to the intake of the air intake system 16. Each of the cylinders 14 includes an air intake valve 36 is that is configured to establish fluid communication between the cylinder 14 and the air intake system 16 when in an opened position and isolate the cylinder 14 from the air intake system 16 when in a closed position. The air intake valve 36 of each cylinder 14 will be in an opened position during the intake stroke of the respective piston 24 and closed during the compression, combustion, and exhaust strokes of the respective piston 24.

The exhaust system 20 includes one or more manifolds, pipes, ducts, or conduits 38 there configured to channel exhaust gas away from the cylinders 14 and to the ambient surroundings. The exhaust system 20 includes a first catalyst 40 (or first catalytic converter) that is configured to reduce the amount of emissions (e.g., $NO_x$ gases or unspent hydrocarbons) in the exhaust gas that is channeled to the ambient air or surroundings. The exhaust system 20 may include a second catalyst 42 (or second catalytic converter) that is configured to further reduce the amount of emissions in the exhaust gas that are channeled to the ambient air or surroundings. The second catalyst 42 may be a redundant catalyst that only further reduces the emissions in the exhaust when the first catalyst 40 is not operating at full capacity or has some malfunction. The exhaust system 20 may further include a particulate filter 44 that is configured to reduce particulate matter in the exhaust and a muffler 46 that is configured to reduce noise. The particulate filter 44 and the muffler 46 may each be downstream of the first catalyst 40 and the second catalyst 42. Each of the cylinders 14 includes an exhaust valve 48 is that is configured to establish fluid communication between the cylinder 14 and the exhaust system 20 when in an opened position and isolate the cylinder 14 from the exhaust system 20 when in a closed position. The exhaust valve 48 of each cylinder 14 will be in an opened position during the exhaust stroke of the respective piston 24 and closed during the intake, compression, and combustion strokes of the respective piston 24.

One or more camshafts (not shown) may be configured to open and close the air intake valve 36 and exhaust valve 48 of each cylinder 14. The camshafts may be connected to the crankshaft 26 by a gearing arrangement, belted arrangement, or some other arrangement to ensure that the air intake valves 36 and exhaust valves 48 are opening and closing when necessary. More specifically, the connection between the crankshaft 26 and the one or more camshafts will ensure that the air intake valve 36 of each cylinder 14 is in the opened position during the intake stroke of the respective piston 24 and closed during the compression, combustion, and exhaust strokes of the respective piston 24. The connection between the crankshaft 26 and the one or more camshafts will also ensure that the exhaust valve 48 of each cylinder 14 is in the opened position during the exhaust stroke of the respective piston 24 and closed during the intake, compression, and combustion strokes of the respective piston 24.

The first catalyst 40 and second catalyst 42 each may consist of a brick that is coated in alumina. The alumina in turn is coated with rhodium, cerium, and platinum or palladium. The rhodium is configured to reduce the amount $NO_x$ gases (combinations of nitrogen and oxygen such NO, $NO_2$, etc.) that are present within the exhaust. More specifically, the rhodium is configured to convert the $NO_x$ gases into nitrogen ($N_2$) and oxygen ($O_2$) by reacting the $NO_x$ gases with oxygen. The platinum or palladium is configured to reduce the amount of unspent hydrocarbons (e.g., $C_8H_{18}$ or $C_1H_4$) that are present within the exhaust. More specifically, the platinum or palladium is configured to convert the hydrocarbons into carbon dioxide ($CO_2$) and water ($H_2O$) by reacting the hydrocarbons with oxygen. The rhodium may also reduce the amount of unspent hydrocarbons within the exhaust, however, the rhodium is primarily utilized to reduce the amount of amount $NO_x$ gases that are present within the exhaust. The platinum or palladium may also reduce the amount of amount $NO_x$ gases that are present within the exhaust, however, the platinum or palladium is primarily utilized to reduce the amount of unspent hydrocarbons that are present within the exhaust. The cerium acts to store oxygen, which is then supplied to the rhodium and the platinum or palladium to effect the reactions described above to convert $NO_x$ gases into nitrogen ($N_2$) and oxygen ($O_2$) and to convert the unspent hydrocarbons into carbon dioxide ($CO_2$) and water ($H_2O$).

The particulate filter 44 is configured to filter any particulate matter out of the exhaust gas in order to prevent the particulate matter from being channeled to the ambient air or surroundings. Particulate matter may refer to any particle within the exhaust guest including rust, oil mixed with any solid material (e.g., metal shavings), simply oil by itself, carbon particles, suspended particulate matter (SPM), thoracic and respirable particles, inhalable coarse particles, which are coarse particles with a diameter between 2.5 and 10 micrometers (µm), fine particles with a diameter of 2.5 µm or less, ultrafine particles, soot (i.e., a mass of impure carbon particles resulting from the incomplete combustion of hydrocarbons), etc.

The fuel delivery system 18 is configured to deliver fuel to each of the cylinders 14. More specifically, the fuel delivery system may include a fuel tank for storing fuel, conduits that establish fluid communication between the fuel tank and fuel injectors 50, and a fuel pump that is configured to direct the fuel from the fuel tank, through the conduits, and to each of the fuel injectors 50. Each cylinder 14 also includes a spark plug 52 that is configured to ignite the air and fuel mixture that is within the cylinder 14 and push down on the respective piston 24 during the power stroke of the cylinder 14.

The vehicle 10 includes a controller 54, which may be a powertrain control unit (PCU). While illustrated as one controller, the controller 54 may be part of a larger control system and may be controlled by various other controllers throughout the vehicle 10, such as a vehicle system controller (VSC). It should therefore be understood that the controller 54 and one or more other controllers can collectively be referred to as a "controller" that controls various components of the vehicle 10 in response to signals from various sensors to control functions such as, shutting down one or more of the cylinders 14 of the engine 12 during a skip-fire mode, selecting or scheduling shifts of a vehicle transmission, adjusting the air-fuel mixture being delivered to the engine 12, etc.

The controller 54 may include a microprocessor or central processing unit (CPU) that is in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 in controlling the engine 12 or subcomponents of the vehicle 10.

The controller 54 may be configured to increase or decrease the power output of the engine 12. More specifically, the controller 54 may be configured to increase or decrease the power output of the engine 12 by increasing or decreasing the airflow and fuel flow into each cylinder 14. The airflow may be increased by adjusting the throttle valve 32 towards a fully open position or decreased by adjusting the throttle valve towards a fully closed position. The fuel flow may be increased by opening the fuel injectors 50 for longer periods of time during each injection of fuel into the cylinder 14 or decreased by opening the fuel injectors 50 for shorter periods of time during each injection of fuel into the cylinder 14. The controller 54 may also increase or decrease the power output of the engine 12 by either retarding or advancing the spark timing of the spark plugs 52.

A mass airflow sensor 56 may be configured to measure the amount of air flowing into the air intake system 16, which is eventually delivered to the cylinders 14, and communicate the amount of air flowing into the air intake system 16 to the controller 54. A throttle position sensor 58 may be configured to communicate the position of the throttle valve 32 to the controller 54. The controller 54 may also be in communication with each of the spark plugs 52, the fuel system 18, and each of the fuel injectors 50. Based on a power demand that is delivered to the controller 54, the controller may adjust the throttle valve 32 position to increase or decrease airflow into the cylinders 14, adjust the timing of the spark plugs 52, and/or adjust the amount of fuel being delivered into the cylinders 14 to either increase or decrease the power output of the engine 12 to meet the power demand. The power demand may be input into the controller 54 by an operator of the vehicle 10 when the operator engages an accelerator pedal 60. Under certain circumstances the power demand may be based on a pre-setting that is stored as control logic within the controller 54. For example, if the vehicle operator is not depressing the accelerator pedal 60 and the engine 12 is on, the amount of power the engine 12 is producing may be adjusted to a preset idle value.

Also, depending on power demand or for emission control purposes, the engine 12 may be configured to operate at a stoichiometric air-fuel mass ratio, a lean air-fuel mass ratio, or a rich air-fuel mass ratio. The air-fuel mass ratio may simply be referred to as the air-fuel ratio. Stoichiometric air-fuel mass ratio has a value of 14.7 to 1. A rich air-fuel mass ratio will be less than 14.7 to 1 and a lean air-fuel mass ration will be greater than 14.7 to 1. An air-fuel equivalence ratio ($\lambda$) has an air-fuel mass ratio that is stoichiometric when $\lambda$ is equal to 1, an air-fuel mass ratio that is rich when $\lambda$ is less than 1, and an air-fuel mass ratio that is lean when $\lambda$ is greater than 1. The air-fuel mass ratio may be controlled, via the controller 54, by adjusting the amount of air and fuel flowing into the cylinders 14.

A first lambda or oxygen sensor 62 may be disposed within the conduits 38 of the exhaust system 20 between the cylinders 14 and the first catalyst 40. The first oxygen sensor 62 may be a universal heated exhaust gas oxygen sensor. The first oxygen sensor 62 is configured to measure the amount of oxygen ($O_2$) that is within the exhaust gas exiting the cylinder 14. Based on the measured amount oxygen in the exhaust gas, the first oxygen sensor 62 generates a signal (e.g., a voltage or current) that correlates with the current air-fuel equivalence ratio ($\lambda$) that the engine 12 is operating at. The signal generated by the first oxygen sensor 62 may indicative of a lean, stoichiometric, or rich current air-fuel equivalence ratio ($\lambda$). The first oxygen sensor 62 communicates the air-fuel ratio or air-fuel equivalence ratio ($\lambda$) measurement to the controller 54, which provides a feedback control to the controller 54. The feedback control may include adjusting the air and/or fuel flowing (i.e., flow rates) into the cylinders 14 via the controller 54 if the air-fuel equivalence ratio ($\lambda$) measured by the first oxygen sensor 62 is different than the air-fuel equivalence ratio ($\lambda$) that is being commanded to the engine 12. More specifically, the feedback control may include adjusting the air and/or fuel flowing into the cylinders 14 to drive the air-fuel equivalence ratio ($\lambda$) that is being measured by the first oxygen sensor 62 toward the air-fuel equivalence ratio ($\lambda$) that is being commanded to the engine 12.

A second lambda or oxygen sensor 64, which has the same functionality as the first oxygen sensor 62, may be disposed within the conduits 38 of the exhaust system 20 between the first catalyst 40 and the second catalyst 42. The second oxygen sensor 64 is utilized to determine the efficiency at which the first catalyst 40 reduces the amount of emissions within the exhaust gas. The second oxygen sensor 64 is configured to communicate a signal that correlates with the measured air-fuel equivalence ratio ($\lambda$) of the exhaust gas back to the controller 54, after the exhaust gas has passed through the first catalyst 40. A particulate sensor 66 may be disposed within the conduits 38 of the exhaust system 20 between the second catalyst 42 and the particulate filter 44. The particulate sensor 66 is configured to measure the amount of particulate matter within the exhaust gas and communicate the measurement to the controller 54 in the form of a signal (e.g., a voltage or current).

One or more temperature sensors 63 may configured to measure the temperature of the first catalyst 40 and/or the second catalyst 42. The temperature sensors 63 are configured to communicate a signal (e.g., a voltage or current) that correlates with a measured temperature of the first catalyst 40 and/or the second catalyst 42 back to the controller 54.

The engine 12 also includes an oil pan or sump 68. An oil pump 70 is configured to direct oil out of the sump 68 and towards various lubrication points 72, such as any of the bearings, journals, valve stems, or any of the other moving parts within the engine 12. A pressure sensor 74 may be configured to measure the pressure of the oil that is being output from the oil pump 70. The pressure sensor 74 may then communicate the oil pressure to the controller 54. An oil level sensor 76 may be configured to measure the level of the oil within the pan or sump 68. The oil level sensor 76 may then communicate the level of the oil to the controller 54.

Referring to FIG. 2, the engine 12 is illustrated as an eight-cylinder engine that includes a first bank 78 of four cylinders 14 and a second bank 80 of four cylinders 14. The first bank 78 of cylinders includes an exhaust system 20 that is configured to channel the exhaust gas away from the first bank 78 of cylinders only. The second bank 80 of cylinders includes an exhaust system 20 that is configured to channel the exhaust gas away from the second bank 80 of cylinders only. Although FIG. 2 illustrates an eight-cylinder engine that includes two banks of cylinders where each bank has its own exhaust system 20, it should be understood that the engine 12 may include two or more cylinders that comprise of one or more banks of cylinders where each bank of cylinders may include a separate exhaust system.

The engine 12 may be a variable displacement engine or a skip-fire engine that may be controlled to shut down or deactivate one or more cylinders 14 while the engine 12 is operating, resulting in the engine 12 being powered by less than all the cylinders 14. Shutting down or deactivating a specific cylinder 14a during skip-fire mode requires shutting down or deactivating the air intake valve 36, exhaust valve 48, spark plug 52, and the fuel injector 50. The engine 12 may be referred to as operating in a skip-fire mode when being powered by less than all of the cylinders 14. The cylinders 14 may be shut down or deactivated in any known pattern to increase the fuel efficiency when conditions are such that the engine 12 may effectively operate in the skip-fire mode to increase fuel efficiency without disturbing the driving requirements of the vehicle operator (e.g., when the number of cylinders can be reduced without reducing the speed of the vehicle). However, it may be desirable to shut down or deactivate the cylinders 14 based on the position of the cylinders 14 in order to directionally equalize the forces that are being transferred to the crankshaft 26 from the pistons 24. Furthermore, which of the cylinders 14 are shut down or deactivated and which of the cylinders 14 are operating may always be changing or rotating when in the skip-fire mode, which may also help to directionally equalize the forces that are being transferred to the crankshaft 26 from the pistons 24.

Figure 3A:
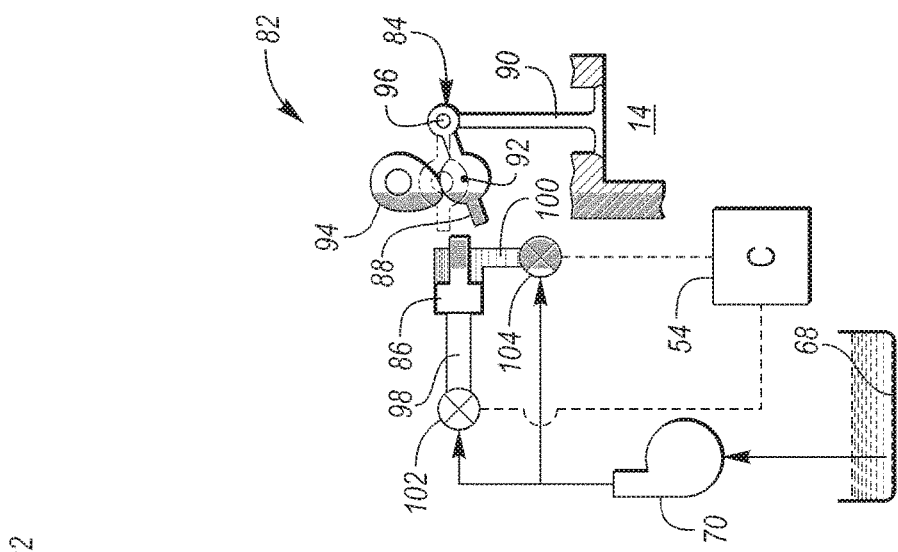
FIGS. 3A-3C illustrate a mechanism that is configured to disable the valves in a variable displacement engine.
Figure 3B:
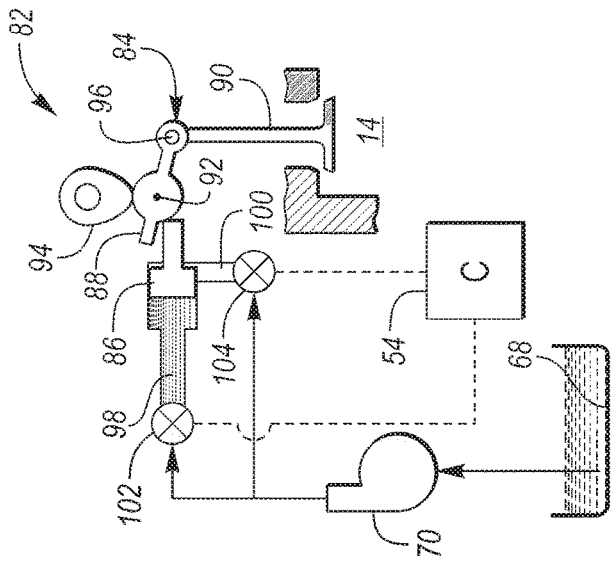
Figure 3C:
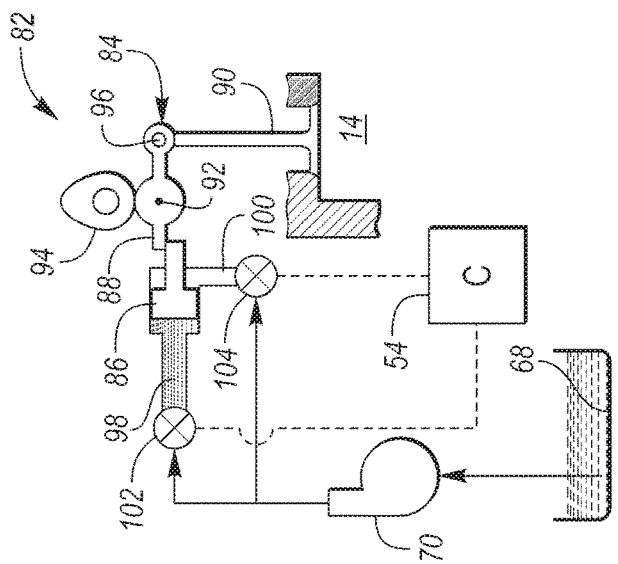

Referring to FIGS. 3A-3C a mechanism 82 that is configured to deactivate the air intake valves 36 and exhaust valves 48 in the variable displacement/skip-fire engine 12 is illustrated. During a skip-fire mode, if a particular cylinder 14 is shut down or deactivated, both the air intake valve 36 and the exhaust valve 48 of that particular cylinder 14 will also be deactivated (i.e., the air intake valve 36 and exhaust valve 48 will be in closed positions and disabled from transitioning to opened positions). The mechanism 82 includes a deactivation arm 84 and a locking pin 86. The locking pin 86 is configured to advance and engage a protrusion 88 that extends outward from the deactivation arm 84. The locking pin 86 is also configured to retract and disengage from the protrusion 88 that extends outward from the deactivation arm 84. A stem valve 90 is secured to an opposing side of the deactivation arm 84 relative to the protrusion 88. The stem valve 90 may be representative of both the air intake valves 36 and the exhaust valves 48.

The deactivation arm 84 will rotate about a first pivot 92 when engaged by a camshaft 94 while the locking pin 86 is engaging the protrusion 88. Rotation of the deactivation arm 84 about the first pivot 92 allows the stem valve 90 to transition between a closed position (see FIG. 3A) and an opened position (see FIG. 3B). The stem valve 90 as depicted in FIGS. 3A and 3B has not been deactivated (i.e., the stem valve 90 will transition between the opened and closed positions in response to rotation of the camshaft 94). The deactivation arm 84 will rotate about a second pivot 96, which rotatably secures the deactivation arm 84 to the stem valve 90, when engaged by the camshaft 94 while the locking pin 86 is disengaged from the protrusion 88. Rotation of the deactivation arm 84 about the second pivot 96 results in the stem valve 90 remaining in the closed position regardless of the position of the camshaft 94 and the position of the deactivation arm 84 (see FIG. 3C). The stem valve 90 as depicted in FIG. 3C has been deactivated (i.e., the stem valve 90 will remain in the closed position and will not transition between the opened and closed positions in response to engagement between the deactivation arm and the camshaft 94).

The locking pin 86 may be advanced and retracted by a pressurized fluid. The oil pump 70 may be configured to deliver pressurized oil to a first chamber 98 that is located on a first side of the locking pin 86 in order to advance the locking pin 86 such that the locking pin 86 engages the protrusion 88. The oil pump 70 may also be configured to deliver pressurized oil to a second chamber 100 that is located on a second side of the locking pin 86 in order to retract the locking pin 86 such that the locking pin 86 disengages from the protrusion 88. A first fluid valve 102 may be disposed within a conduit between the oil pump 70 and the first chamber 98. A second valve 104 may be disposed within a conduit between the oil pump in the second chamber 100. The pressurized fluid is delivered to the first chamber 98 when the first valve 102 is open and the second valve 104 is closed. The pressurized fluid is delivered to the second chamber 100 and when the first valve 102 is closed and the second valve 104 is open. When the first valve 102 is opened and the second valve 104 is closed, the locking pin 86 is advanced (see FIGS. 3A and 3B) and the stem valve 90 may transition between the opened and closed positions (i.e., the stem valve 90 has not been deactivated). When the first valve 102 is closed and the second valve 104 is opened, the locking pin 86 is retracted (see FIG. 3C), the stem valve 90 remains in the closed position, and the stem valve 90 cannot transition to the opened position (i.e., the stem valve 90 has been deactivated).

The controller 54 may be configured to open and close the first valve 102 and the second valve 104 to either advance or retract the locking to pin 86 to respectivley activate or deactivate the stem valve 90. More specifically, the controller 54 may be configured to activate or deactivate the air intake valve 36 and the exhaust valve 48 of a particular cylinder 14 by utilizing the mechanism 82 depicted in FIGS. 3A-3C, depending on whether the engine 12 is operating in a mode where the particular cylinder 14 is activated or operating in a skip-fire mode that requires the particular cylinder 14 to be shut down or deactivated. When the air intake valve 36 and the exhaust valve 48 of a particular cylinder 14 are deactivated, the particular cylinder 14 is also deactivated. Each valve (air intake valve 36 and exhaust valve 48) for each cylinder 14 may include an associated mechanism 82 for disabling the particular valve. The mechanism 82 depicted in FIGS. 3A-3C is not intended to be limiting. The engine 12 may be a variable displacement/skip-fire engine where the valves of a particular cylinder (and therefore the cylinder itself) may be deactivated by any method known in the art.

Figure 4:
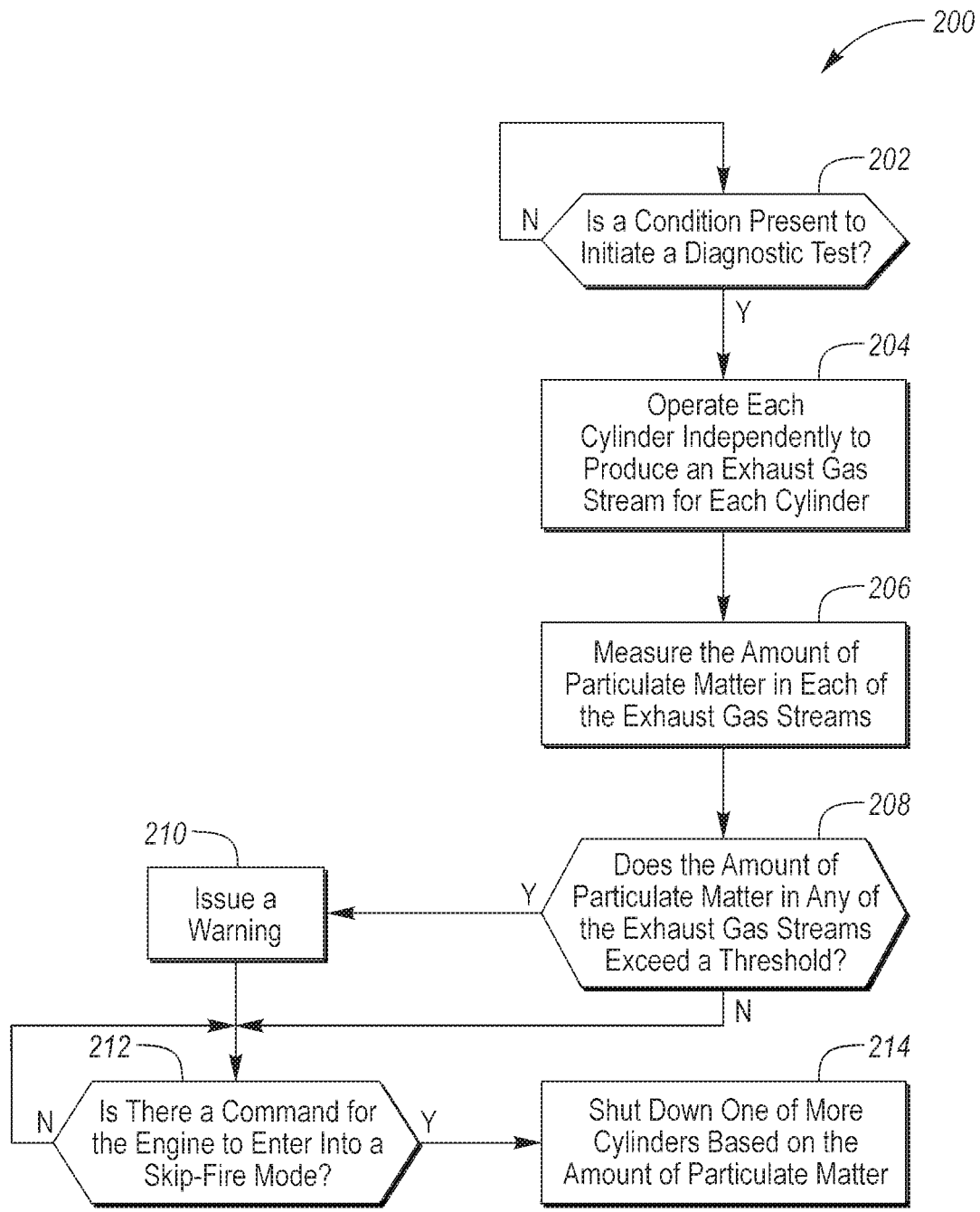
FIG. 4 is a flowchart illustrating a control method for controlling a variable displacement engine.

Referring to FIG. 4, a flowchart of a control method 200 for controlling the variable displacement or skip-fire internal combustion engine 12 is illustrated. The method 200 may be stored as control logic and/or an algorithm within the controller 54. The controller 54 may be programmed to implement the method 200 by controlling the various components of the vehicle 10. The method 200 begins at block 202 where it is determined if a condition is present to initiate a diagnostic test to determine the amount of particulate matter that is being produced by the cylinders 14 of the engine 12. If any of the various seals and/or piston rings of a particular cylinder 14 are excessively worn within the engine 12 or if the pressure within the crankcase (i.e., the space below the pistons 24 where the crankshaft 26 is housed) exceeds the pressure within the combustion chamber (i.e., the space above the pistons 24 where air-fuel mixture is combusted) of a particular piston 24, the amount of particulate matter that passes from the crankcase, into the combustion chamber, and ultimately into the exhaust may increase. If an excess amount of particulate matter is sensed within the exhaust of a particular cylinder via the particulate sensor 66, the specific cylinder may need to be serviced (e.g., the seals and/or rings may need to be replaced).

If it is determined that a condition is not present to initiate the diagnostic test, the method 200 recycles back to the beginning of block 202. If it is determined that a condition is present to initiate the diagnostic test, the controller 54 issues a command to run the diagnostic test, and the method 200 moves on to block 204. The condition that triggers the command to run the diagnostic test may be based on the pressure of the engine oil exceeding a threshold value (which may be either the oil pressure at the output of the oil pump 70 or the oil pressure within the sump 68), the pressure of the engine oil being less than a threshold value (which may be either the oil pressure at the output of the oil pump 70 or the oil pressure within the sump 68), the oil level within the sump 68 being less than a threshold value, a predetermined period of time a lapsing after a previously run diagnostic test (which may be a preset time period and/or may be tracked by an algorithm or control logic that is stored within the controller 54), or a predetermined period of time lapsing after the oil in the engine has been changed (which may be based on a user input into the controller 54 via a control panel that is indicative that the oil in the engine has been changed).

At block 204, each cylinder 14 of the engine 12 is operated independently to produce an exhaust stream for each cylinder 14. The amount of particulate matter within each exhaust stream produced by each cylinder 14 is then measured via the particulate sensor 66 at block 206. The cylinders 14 may be operated over a range of air-fuel ratios at block 204. The amount of particulate matter within each exhaust stream produced by each cylinder 14 may then be measured over the range air-fuel ratios at block 206. For example, the cylinders 14 may be operated at an air-fuel equivalence ratio ($\lambda$) at block 204 that ranges between 0.96 and 1.10. Alternatively, if the engine 12 includes multiple banks of cylinders (e.g., the first bank 78 and the second bank 80 in FIG. 2) each cylinder 14 from each bank of cylinders may be operated independently to produce an exhaust stream for each cylinder 14. The amount of particulate matter within each exhaust stream produced by each cylinder 14 from a specific bank of cylinders is then measured via the particulate sensor 66 of the exhaust system 20 that is configured to channel the exhaust gas away from the specific bank of cylinders at block 206. Once each cylinder 14 has been operated independently and the amount particulate matter within each exhaust stream produced by each cylinder 14 has been measured at blocks 204 and 206, the method 200 moves on to block 208.

The amount of particulate matter within each exhaust stream produced by each cylinder 14 may be recorded over several cycles of diagnostic testing and stored as data within the controller 54. The data may be stored over the lifetime of the engine 12 or may be stored for a predetermined period of time. If the amount of particulate matter changes or increases gradually over time, it is likely due to the normal wear and tear of the engine. On the other hand, if the amount of particulate matter increases drastically over a short period of time, that may be indicative of a problem that is beyond normal wear and tear, which may require servicing of the engine 12.

At block 208, it is determined if the amount of particulate matter within any of the exhaust streams produced by any the cylinders 14 exceeds a threshold. If the amount of particulate matter within one or more of the exhaust streams exceeds the threshold, the method 200 moves on to block 210 where the controller 54 issues a warning that one or more the cylinders 14 are producing an excessive amount of particulate matter. The warning may be generic and only indicate that there is a problem with the engine 12 or the warning may be specific and indicate which of the cylinders 14 or which bank of cylinders is producing the excessive amount of particulate matter. The warning may be audible (e.g., the warning may be issued through sound speakers within a cabin of the vehicle), visual (the warning may be the illumination of a warning light within the vehicle), haptic (e.g., vibrations transmitted through the steering wheel, accelerator pedal, brake pedal, seat, etc.), or by any other source known in the art. After the warning has been issued at block 210, the method 200 moves on to block 212. Returning to block 208, if the amount of particulate matter within all of the cylinders 14 of the engine 12 does not exceed the threshold, the method also moves on to block 212.

At block 212, it is determined if the controller 54 has issued a command to decrease the number of operating cylinders 14 in the engine 12 (i.e., it is determined if a command has been issued to transition the engine 12 to a skip-fire mode). If it is determined that the controller 54 has not issued a command to decrease the number of operating cylinders, the method 200 recycles back to the beginning of block 212. If it is determined that the controller has issued a command to decrease the number of operating cylinders, the method 200 moves on to block 214 where one or more of the cylinders 14 are shut down or deactivated based on the measured amount of particulate matter within the exhaust gas streams produced by each cylinder 14. More specifically, if it was determined at block 208 that none of the cylinders 14 produced an excessive amount of particulate matter (i.e., the measured amount particulate matter within the exhaust gas streams was less than the threshold), the controller 54 may command any of the cylinders 14 to shut down or deactivated in any desirable pattern (e.g., the cylinders 54 may be shut down or deactivated in a pattern that directionally equalizes the forces that are being transferred to the crankshaft 26 from the pistons 24).

If it was determined at block 208 that one or more of the cylinders 14 did produce an excessive amount of particulate matter (i.e., the measured amount particulate matter within the exhaust gas streams from one or more of the cylinders 14 was greater than the threshold), then the cylinders 14 that did produce an excessive amount of particulate matter may be shut down or deactivated chronologically first when the engine 12 is transitioned into the skip-fire mode at block 214.

Alternatively, regardless of whether or not one or more of the cylinders produced an excessive amount of particulate matter (i.e., regardless of whether or not the measured amount particulate matter within the exhaust gas streams from one or more of the cylinders 14 was greater than the threshold), the controller 54 may be programmed to shut down or deactivated the one or more cylinders 14 in a sequence that ranks from the cylinder 14 that produces the most particulate matter to the cylinder 14 that produces the least particulate matter when the engine 12 is transitioned into the skip-fire mode at block 214. It should be understood that the flowchart depicted in FIG. 4 is for illustrative purposes only and that the method 200 should not be construed as limited to the flowchart in FIG. 4. Some of the steps of the method 200 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a variable displacement engine having a plurality of cylinders;
a conduit configured to channel exhaust gas away from the cylinders;
a sensor disposed within the conduit and configured to measure an amount of particulate matter within the exhaust gas; and
a controller programmed to, in response to a command to run a diagnostic test, operate each of the plurality of cylinders independently to produce an exhaust gas stream for each cylinder and measure the amount of particulate matter within each of the exhaust gas streams.

2. The vehicle of claim 1, wherein the controller is further programmed to, in response to a command to decrease the number of operating cylinders, shut down one or more of the plurality of cylinders based on the measured amount of particulate matter.

3. The vehicle of claim 2, wherein the controller is programmed to shut down the one or more of the plurality of cylinders in a sequence that ranks from the cylinder that produces the most amount of particulate matter to the cylinder that produces the least amount of particulate matter.

4. The vehicle of claim 1, wherein the controller is further programmed to, in response to the amount of particulate matter produced by one or more of the plurality of cylinders exceeding a threshold, issue a warning.

5. The vehicle of claim 1, wherein the command to run the diagnostic test is based on an engine oil pressure exceeding a threshold.

6. The vehicle of claim 1, wherein the command to run the diagnostic test is based on an engine oil pressure being less than a threshold.

7. The vehicle of claim 1, wherein the command to run the diagnostic test is based on an engine oil level being less than a threshold.

8. The vehicle of claim 1, wherein the command to run the diagnostic test is based on a predetermined period of time elapsing after a previously run diagnostic test.

9. The vehicle of claim 1, wherein the command to run the diagnostic test is based on a predetermined period of time elapsing after an oil change.

10. A method of operating a vehicle engine having a plurality of cylinders comprising:
operating each cylinder independently to produce an exhaust gas stream for each cylinder;
measuring an amount of particulate matter within each of the exhaust gas streams; and
in response to a command to decrease the number of operating cylinders, shutting down one or more of the cylinders based on the measured amount of particulate matter.

11. The method of claim 10, wherein the one or more of the plurality of cylinders are shut down in a sequence that ranks from the cylinder that produces the most amount of particulate matter to the cylinder that produces the least amount of particulate matter.

12. The method of claim 10 further comprising:
in response to the amount of particulate matter produced by one or more of the plurality of cylinders exceeding a threshold, issuing a warning.

13. A vehicle comprising:
an engine having first and second banks cylinders;
an exhaust pipe configured to channel exhaust gas away from the first bank of cylinders;
a sensor disposed within the exhaust pipe and configured to measure an amount of particulate matter within the exhaust gas; and
a controller programmed to, in response to a command to run a diagnostic test, operate each cylinder of the first bank of cylinders independently to produce an exhaust gas stream for each cylinder of the first bank of cylinders and measure the amount of particulate matter within each of the exhaust gas streams produced by each cylinder of the first bank of cylinders.

14. The vehicle of claim 13 further comprising:
a second exhaust pipe configured to channel exhaust gas away from the second bank of cylinders; and
a second sensor disposed within the second exhaust pipe and configured to measure the amount of particulate matter within the exhaust gas.

15. The vehicle of claim 14, wherein the controller is further programmed to, in response to a command to run a diagnostic test, operate each cylinder of the second bank of cylinders independently to produce an exhaust gas stream for each cylinder of the second bank of cylinders and measure the amount of particulate matter within each of the exhaust gas streams produced by each cylinder of the second bank of cylinders.

16. The vehicle of claim 15, wherein the controller is further programmed to, in response to a command to decrease the number of operating cylinders, shut down one or more of the cylinders from the first or second bank of cylinders based on the measured amount of particulate matter.

17. The vehicle of claim 16, wherein the controller is programmed to shut down the one or more of the cylinders from the first or second bank of cylinders in a sequence that ranks from the cylinder that produces the most amount of particulate matter to the cylinder that produces the least amount of particulate matter.

18. The vehicle of claim 15, wherein the controller is further programmed to, in response to the amount of particulate matter produced by one or more of the cylinders from the first or second bank of cylinders exceeding a threshold, issue a warning.

19. The vehicle of claim 13, wherein the command to run the diagnostic test is based on an engine oil pressure exceeding a threshold.

20. The vehicle of claim 13, wherein the command to run the diagnostic test is based on an engine oil level being less than a threshold.

* * * * *